United States Patent [19]

Marin et al.

[11] Patent Number: 4,791,240

[45] Date of Patent: Dec. 13, 1988

[54] ELECTRIC CABLE WITH STRANDED CONDUCTOR FILLED WITH WATER BLOCKING COMPOUND AND WITH EXTRUDED INSULATION

[75] Inventors: Carlo Marin, Vigevano; Giovanni Pozzati, Olgiate Olona, both of Italy

[73] Assignee: Societa' Cavi Pirelli S.p.A., Milan, Italy

[21] Appl. No.: 37,603

[22] Filed: Apr. 13, 1987

[30] Foreign Application Priority Data

Apr. 14, 1986 [IT] Italy ................................. 20078 A/86

[51] Int. Cl.$^4$ ................................................ H01B 9/02
[52] U.S. Cl. .................................. 174/23 C; 174/23 R; 252/570; 523/173
[58] Field of Search ............. 174/23 R, 23 C; 156/48; 252/570; 523/173

[56] References Cited

U.S. PATENT DOCUMENTS

| | | | |
|---|---|---|---|
| 3,830,953 | 8/1974 | Wood et al. ...................... | 174/23 C |
| 3,836,695 | 9/1974 | Strecker et al. ................... | 174/23 C |
| 3,893,961 | 7/1975 | Walton et al. ................. | 174/23 C X |
| 4,020,276 | 4/1977 | Maingueneau ..................... | 174/23 R |
| 4,105,619 | 8/1978 | Kaufman et al. ............. | 174/23 C X |
| 4,259,540 | 3/1981 | Sabia ................................ | 174/23 C |
| 4,308,416 | 12/1981 | Herman et al. ................... | 174/23 C |
| 4,326,094 | 4/1982 | Hunn ................................ | 174/23 R |
| 4,435,613 | 3/1984 | Gaubert ........................ | 174/23 C X |
| 4,504,699 | 3/1985 | Dones et al. ..................... | 174/76 X |
| 4,551,569 | 11/1985 | Verne ........................... | 174/23 C X |

FOREIGN PATENT DOCUMENTS

| | | | |
|---|---|---|---|
| 3438780 | 4/1986 | Fed. Rep. of Germany ...... | 523/173 |
| 2034345 | 11/1970 | France ............................. | 174/23 R |
| 38300 | 11/1979 | Japan .............................. | 174/23 C |
| 1484850 | 9/1977 | United Kingdom .............. | 174/23 C |

*Primary Examiner*—Morris H. Nimmo
*Attorney, Agent, or Firm*—Brooks Haidt Haffner & Delahunty

[57] ABSTRACT

A filler compound for the spaces between the wires of a stranded conductor surrounded by and contacting a semiconductive layer which is surrounded by a layer of extruded insulation, a method for filling such spaces with the compounds and an electric cable including such compound. The compound has a polymeric base, a Mooney viscosity at 100° C. between 10 and 60 and a Shore A hardness between 10 and 90. Preferably, the compound includes hygroexpansible, water insoluble organic powder having particle sizes less than 200 microns and specified other characteristics.

12 Claims, 1 Drawing Sheet

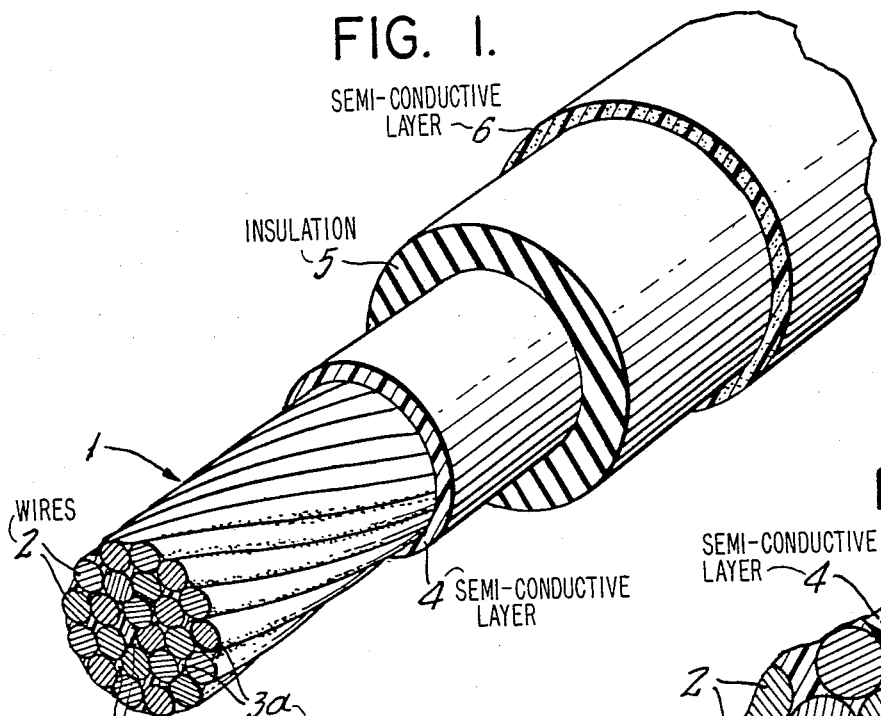
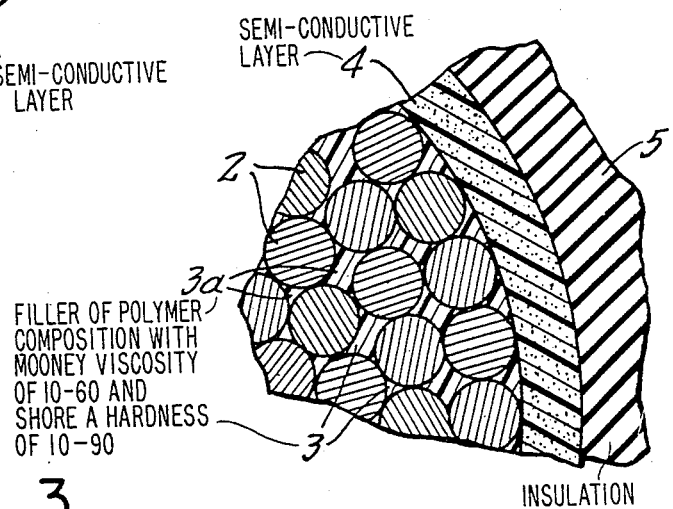
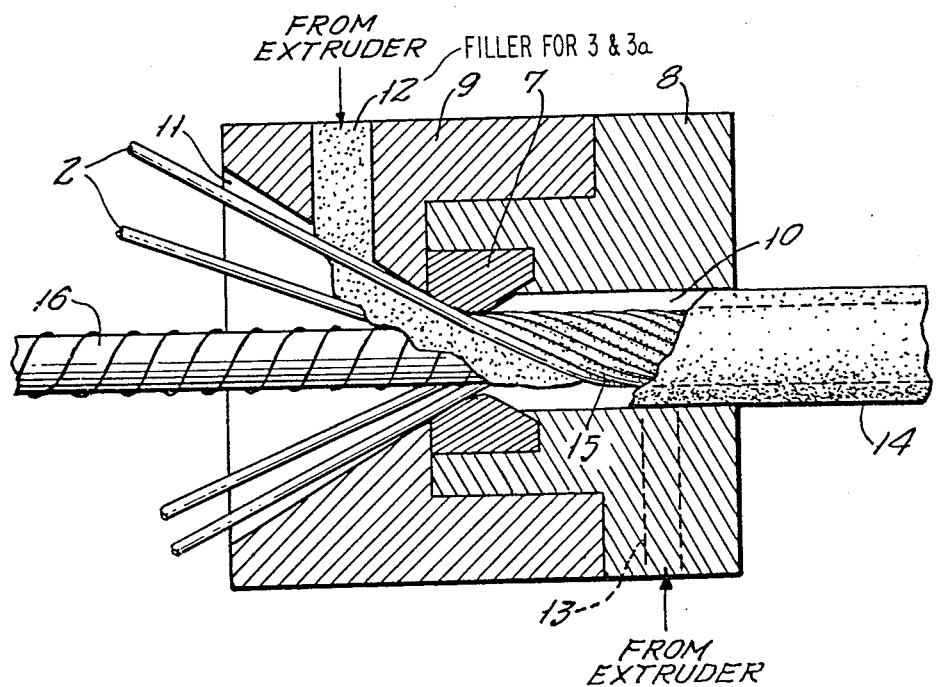

ELECTRIC CABLE WITH STRANDED CONDUCTOR FILLED WITH WATER BLOCKING COMPOUND AND WITH EXTRUDED INSULATION

This invention relates to electric cables having extruded insulation and of the type wherein a filler is incorporated into the conductor for preventing even minimum traces of water from migrating along the cable.

Moreover, the invention relates to a filler for the conductors of cables having an extruded insulation and to a process for manufacturing the cables of said type.

It is already known that one of the causes of the formation of "trees" in the extruded insulation of a cable is the presence of moisture in the conductor.

In fact, during the cable use and due to the effects of the temperature reached during the use of the conductor (which, although it is not high, is maintained however, for practically an indefinite period), evaporation of all existing traces of water in said conductor takes place. The water vapor which is thus formed migrates, due to the diffusion phenomena, into the extruded insulation of the cable.

The water vapor which, in this manner, penetrates into the extruded insulation of the cable and the electrical stresses which exist in the insulation give rise to the formation of "trees" in the extruded insulation which can cause a decrease in the electrical properties of the insulation and consequently, increases electrical perforation risks.

Even though during the manufacture of cables with extruded insulations, all those expedients known to one skilled in the art for guaranteeing the absence of even minimum traces of water reaching the conductor are put into effect, there is no way of preventing in an absolute manner that, during the installation and laying operations of a cable, during the cable joining operations, or because of subsequent ruptures in the cable structure, water will never reach the cable conductor and/or migrate along it.

For preventing the water which has reached one point in the conductor in an extruded insulation cable from migrating along at, with the formation of trees in the cable insulation, it has been proposed to introduce fillers at least in the conductor, preferably, fillers of the type which swell when contacting water, which will prevent any such water from migrating along the cable conductor.

In particular, in the known cables with extruded insulation and having the conductor impregnated with a filler, it is considered preferable for the filler to be of the type which swells on contact with water since it is believed that only this type of filler provides the best possibilities for blocking the migration of any traces of water along the cable by exploiting the swelling of the filler for thereby creating a barrier against the water migration.

Known cables having extruded insulations and which incorporate, inside the conductor, a filler which swells on coming into contact with water are, for example, described in the German patent application No. 2,216,139, and in the U.K. patent No. 2,076,839.

All known cables having extruded insulation of the type incorporating a filler of the type which swells when coming in contact with water in the conductor, do not allow for solving, in a reliable and secure manner, the problem of preventing the migration of water in spite of all the numerous attempts made for discovering the filler which is most suitable for solving the problem.

This lack of reliability of the known cables having extruded insulations when facing the problem of preventing the migration of water is also unacceptable in cases of cable use in underwater ambients where the risks of the entry and spreading of water along the entire cable, if a rupture occurs in the cable, is very high because, as is known, repairs to a cable require a considerable period of time before being effectuated, and the hydrostatic pressure exercised the water is generally high.

One object of the present invention is to provide cables having extruded insulation which are provided with a filler in their conductors and which are also intended for use in submarine environments, the spreading of water in the conductor being prevented, in an absolute manner and hence, no risks are run of any trees forming due to such water spreading.

Other objects of the present invention are a filler for the conductors of cables having extruded insulation and for electrical conductors and a process for manufacturing cables and electrical conductors of such type, of traces of water accidentally coming into contact at some point along and into the conductor is prevented.

In accordance with the preferred embodiment of the present invention, an electric cable comprising at least one conductor in the form of a rope constituted by a plurality of metallic wires laid up together and impregnated with a filler, a semiconductive layer which covers the outer surface of the conductor, and an extruded insulation around the semiconductive layer is characterized by the fact that said filler is a compound based on polymeric materials which compound covers the single wires of the rope and fills up every existing space in-between them, the said compound having a Mooney viscosity at 100° C. of between about 10 and about 60 and a Shore A hardness at room temperature of between about 10 and about 90.

Moreover, whenever a hygroexpansible powder is incorporated in said compound for causing the said filler to swell on contact with water, the hygroexpansible powder is made out of an organic material and the compound swells not less than 5% after 10 seconds of contact with water and has an asymptotical saturation swellage of not less than 40%. An an electrical conductor per se filled with the fillers described herein resist corrosion and is included in the invention.

In accordance with the present invention, a filler compound for conductors of electrical cables and electrical conductors pre set is characterized by the fact that said compound is based on polymeric materials, said compound having a Mooney viscosity at 100° C. of between about 10 and about 60 and a Shore A hardness at room temperature of between about 10 and about 90.

Moreover, whenever a hygroexpansible powder is incorporated in said compound for causing said filler to swell on contact with water, the hygroexpansible powder is made from an organic material and the compound swells not less than 5% after 10 seconds of contact with water and has an asymptotical saturation swellage of not less than 40%.

In accordance with the present invention, a method for manufacturing electric cables and electrical conductors comprises the steps of impregnating a metallic rope intended for forming the conductor of the cable with a filler which swells on contacting water and of extruding, in direct contact with the filled rope, a semiconductive layer and an insulating layer, characterized by the fact that the impregnating of the metallic rope is done at the time of its construction by inserting the filler, using extrusion means, into the assembly of the wires to be laid up and made compact for forming the rope and the already-formed rope portion, during its advancement toward a joining die.

Other objects and advantages of the present invention will be apparent from the following detailed description of the presently preferred embodiments thereof, which description should be considered in conjunction with the accompanying drawings in which:

FIG. 1 is a perspective view of a cable according to the invention, with parts removed;

FIG. 2 is a fragmentary, enlarged cross-section of a cable according to the invention; and represents even a portion of an electrical conductors according to the invention.

FIG. 3 is a schematic, side elevation view, partly in section, of a device for carrying out the method for making a cable according to the invention.

A cable of the invention is illustrated in FIGS. 1 and 2, and comprises (from the inside towards the outside), a conductor 1 in the form of a rope made up of a plurality of metallic wires 2 made, for example, of copper or of aluminum and which are laid up together.

The individual metallic wires 2, except for those forming the outermost layer of the rope (as shown in FIG. 2), are completely surrounded by a filler 3a, the characteristics of which form an essential element of the cable according to the invention and which are set forth hereinafter. Even the spaces 3 which are in-between the metallic wires 2 are completely filled up with the filler 3a.

Around the conductor 1, is disposed an extruded semiconductive layer 4 which engages the radially outermost surface of the conductor 1.

The semiconductive layer 4 closely covers that part of the surface of wires 2 with which the radially outermost layer is made and extends between the surfaces of the outer wires 2 outwardly of the points of contact of the outer wires 2. Over the semiconductive layer 4, there is an extruded insulating layer 5 which is covered, in its turn, with an extruded semiconductive outer layer 6.

Around the semiconductive layer 6, other per se known elements (not shown) can also be provided, such as, for example, a sheath, protective layers for the sheath, armoring, etc.

According to an alternative embodiment of a cable according to the invention, the spaces in-between the wires 2 that form the outermost layer of the conductor 1 and the layer of wires 2 which lie immediately beneath it, there can be present, in substitution for the filler, or in addition to it, hygroexpansible powders of an organic nature, the characteristics of which are set forth hereinafter.

As previously stated, the essential element of a cable according to the invention is a filler inside the conductor 1 with the following characteristics. The same applies to an electrical conductor per se according to the invention.

The filler is formed by a compound, based upon any polymer whatsoever, but said compound has to possess the following two properties:

(1) The Mooney viscosity at 100° C., must be from about 10 to about 60, and preferably, said viscosity is in the range from 20 to 40; and (2) The Shore A hardness, determined according to the Standards ASTM D 2240, and hence, at room temperature and with instrument readings done 5 seconds after the start of the test, must be from about 10 to about 90 and preferably, in the range from 50 to 80.

Moreover, when a hygroexpansible powder is also contained in said compound, said powder is of the organic type, and the quantity of said powder in the compound can be the amount which will provide swelling of the compound, when placed in contact with water, which corresponds to an increase in the thickness of a slab of such compound having a thickness of 1 mm and with opaque surfaces and corresponds to the following values.

(a) After 10 seconds of contact with water, the swelling shall be over 5% and preferably, over 10%; and (b) The saturation swelling of the compound, determined from the asymptotical value of its swelling when in contact with water and particularly, sea-water, should not be less than 40% and preferably, not less than 60%. The amount of hygroexpansible powder in the compound should not exceed 60 parts by weight per 100 parts by weight of the polymer. For the formation of the compound forming a filler of a cable according to the invention, any whatsoever polymer can be used for forming the extrudible compound, and can, for example, be natural rubber, butadiene-styrene copolymers, isobutylene polymers and copolymers, ethylene-propylene copolymers and related terpolymers, and ethylene-vinyl-acetate copolymers.

On the other hand, the hygroexpansible powder of the organic type, which forms one of the components of the compound with which the cable conductor according to the invention is plugged, or into which it is inserted, should possess the following properties:

A. the powder must be substantially insoluble in water;

B. the pH value of a watery dispersion of the powder, obtained by a dispersion of 1 gr. of powder in 200 $cm^3$ of bidistilled water, must be from about 6.5 to about 7.5;

C. the weight loss of the powder, after being heated at 105° C., must be less than 7%;

D. the wettability time for the powders (which corresponds with the period elapsing, from the moment when the powder is put into contact with water and the moment when it starts to swell), must be from about 1 to about 5 seconds regardless of whether the water used is the water utilized for industrial purposes or is sea water;

E. the water absorption capacity of the powder, expressed in $cm^3$ of the water absorbed by 1 gr. of powder, must be from about 100 to about 800 $cm^3/gr$. Specifically, the absorption capacity of the powder for an industrial type of water, must be within the range of from 500 to 800 $cm^3/gr$. whereas, the absorption capacity of the powder for sea water, must be within the range of from about 100 to about 150 $cm^3/cm$; and F. the particles of the hygroexpansible powder must have maximum dimensions of less than about 200 microns and preferably, at least 50% of the granules of said powder must have maximum dimensions of less than about 150 microns.

The characteristics for the hygroexpansible powders of the organic type set forth hereinbefore are those which have been found as being essential both for realizing filler compounds which are swellable, when coming into contact with the water in conductors according to the invention and for the powders which are inserted into said conductors together with, or else, in substitution for the filler compound, into the spaces between the wires 2 of the outermost layer of the conductor and the wires of the layer lying immediately therebeneath according to an alternative embodiment for a cable previously described.

The chemical nature of the powders can be of various kinds. Examples of hygroexpansible powders of the organic type, are polyacrylates and polyacrylamides, either in se or grafted on natural polymers such as the amides, cellulose and esthers of methyl-cellulose and the ethers of cellulose, such as, carboxymethyl cellulose.

In addition to the above-described components, other components can also be included in the filler, such as, for example, semiconductive powders, if a semiconductive filler is desired, or cross-linking agents, if a cross-linked filler is desired for the cable conductor.

By way of example, four specific forms for the compound for forming the fillers, according to the invention, for the conductors of cables having extruded insulations, and for electrical conductors per se also according to the invention will be set forth hereinafter.

EXAMPLE 1

The filler of this example comprises a non-cross-linkable, insulating compound which is not swellable when in contact with water and has the following composition:

| | |
|---|---|
| Ethylene-vinyl-acetate copolymer having a 45% content of vinyl-acetate | 100 parts by weight |
| Extra-conductive carbon black | 25 parts by weight |
| Epoxidated soya oil | 10 parts by weight |
| Calcium carbonate | 30 parts by weight |

EXAMPLE 2

The filler of this example comprises a cross-linkable, semiconductive compound which is not swellable when in contact with water and has the following composition:

| | |
|---|---|
| Ethylene-vinyl-acetate copolymer having a 45% content of vinyl-acetate | 100 parts by weight |
| Extra-conductive carbon black | 25 parts by weight |
| Epoxidated soya oil | 10 parts by weight |
| Calcium carbonate | 30 parts by weight |
| Dicumyl-peroxide | 1.5 parts by weight |

EXAMPLE 3

The filler of this example comprises a semiconductive and non-cross-linkable compound which swells when in contact with water and has the following composition:

| | |
|---|---|
| Ethylene-vinyl-acetate copolymer having a 45% content of vinyl-acetate | 100 parts by weight |
| Extra-conductive carbon black | 25 parts by weight |
| Epoxidated soya oil | 10 parts by weight |
| Carboxy-methyl cellulose in powder form with granules having maximum dimensions of less than 200 micron | 30 parts by weight |

EXAMPLE 4

The filler of this example comprises an insulating, cross-linkable compound which swells when in contact with water and has the following composition:

| | |
|---|---|
| Ethylene-vinyl-acetate having a 45% content of vinyl-acetate | 100 parts by weight |
| Epoxidated soya oil | 5 parts by weight |
| Carboxy-methyl cellulose in powder form with granules having maximul dimensions of less than 200 micron | 30 parts by weight |
| Dicumyl-peroxide | 1.5 parts by weight |

Cables with extruded insulation having a conductor filler according to the invention and electrical conductors per se are produced by a method which also forms part of the invention. An essential element of the method in question is the step of impregnation of the rope-like conductor with the filler.

This step of the method consists in inserting, by means of extrusion, the compound forming the filler in-between the assembly of wires which are intended for forming each layer of wires of the rope forming the conductor and the rope portion, already formed, also impregnated with the filler compound according to the step, when it is being formed, while the said wires and the said rope portion advance toward the joining die.

Obviously, during the formation of the first layer of wires of the rope whereby said wires, together with a wire intended for occupying the radially innermost position of the rope itself, are advanced toward a joining die, the compound forming the filler becomes inserted, by means of extrusion, between the assembly of wires and the wire intended for occupying the radially innermost position of the said rope.

The insertion, by extrusion, of the plugging compound inbetween the assembly of the wires and the rope portion is effectuated by directing a flow of compound from outside the wires towards the already-formed rope portion.

As an alternative, the insertion, by extrusion, of the plugging compound in-between the assembly of the rope wires intended for forming a layer of wires of the rope and the already formed rope portion while these said elements advance towards a joining die is obtained by forming, by extrusion, a layer of plugging compound around the already-formed rope portion.

By combining together in the same joining die, the two described operations of introducing the plugging compound, it is possible to reduce the number of extruders utilized for forming said rope.

Thereafter, there follow for a cable the already known steps of extruding on the filled conductor an inner semiconductive layer which adheres to and engages the radially outermost surface of the rope, an insulating layer which surrounds the inner semiconductive layer and an outer semiconductive layer.

The filled conductor, covered by the above-described layers, is caused to pass through a vulcanizer for the purpose of crosslinking the layers and, if so desired, for cross-linking the filler which fills the rope, i.e. if the compound forming said filler is of the cross-linkable type.

In FIG. 3, there is schematically shown a side elevation view, partly in cross-section, of a device for effectuating the previously described necessary steps of the method according to the invention.

As can be seen in FIG. 3, the device comprises an annular die 7 secured to and coaxial with a cylindrical body which is formed by two parts 8 and 9 which are joined together and which has a through-cavity. The part 8 of the cylindrical body has a cylindrical shaped cavity 10 through which the rope portion 15, formed in the device of FIG. 3, passes.

The part 9 of the cylindrical body has a truncated coneshaped inner cavity 11 which, in correspondence to the lesser base thereof, extends to the cavity of the annular die 7.

The wires 2, intended for forming the outermost layer of the rope portion 15 which was produced in the device, and the core 16 of the rope produced previously with an identical device and already impregnated with the filler compound pass through the cavity 11.

In the part 9 of the cylindrical body, there is a through-hole 12 communicating with an extruder (not shown) which delivers the filler compound of the invention into the truncated-cone cavity 11.

The functioning of the device illustrated in FIG. 3 is as described hereinafter:

The wires 2, and the core 16 of the rope previously formed and already impregnated with the filler, advance in a continuous manner toward the annular die 7. During said advance, the wires 2 and the core 16 drag along with them the filler material which the extruder has delivered by means of the through-hole 12 into the truncated-cone cavity 11, and said material passes through the wires 2 as they approach the core 16 of the rope.

The filler material is prevented by the wires 2 and the core 16 from passing through the annular die 7 (where the joining and the compacting of the plurality of wires 2 on the already impregnated core 16 takes place), fills up all the spaces existing between the wires and assuring that at least one layer of the filler material exists between the wires 2 and the wires which are disposed in the radially outermost portion of said core 16.

In addition to this, the device of FIG. 3 can also be provided with another through hole 13 (indicated with a broken line) in the part 8 of the cylindrical body which also communicates with the extruder for forming a layer 14 of filler compound around the already formed portion 15.

If another layer of wires 2 is to be applied over the structure leaving the device shown in FIG. 3, the other layers of wires 2 may be applied over such structure by a second device the same as the device shown in FIG. 3 and disposed downstream thereof, but if a layer 14 of filler is not to be applied to the exterior of the rope at the second device, the through hole 13 may be omitted.

With the method according to the invention, and with the examples given for the filler compounds, four special cables, according to the invention, were produced. These four cables were subjected to the experimental tests described hereinafter, the results of which demonstrated that with these cables the objects of the invention was achieved.

The four special cables differ from each other only by the fact that their conductor fillers are made out of the compounds set forth in the previously given examples and that the cross-linking of these compounds is only carried out with the cross-linkable compounds. Otherwise, the four special cables have identical structures and the dimensions of the component parts of said structures are also identical.

More specifically, all four of the cables had a conductor made of a rope having a diameter of 18.8 mm, formed by 37 wires of tin-plated copper, each wire having a diameter of 3.13 mm, the wires being disposed in such a way as to form three concentric layers.

Around the conductor there is disposed a 1 mm thick, cross-linked semiconductive layer of a semiconductive compound based on ethylene-propylene rubber, known per se, and commonly used for forming semiconductive layers in cables. Over said semiconductive layer there was an extruded cross-linked insulating layer with a thickness of 8 mm of an insulating compound based on ethylene-propylene rubber, known per se, and commonly used in forming the extruded insulation of cables.

Another semiconductive layer, identical to the one described surrounds the insulating layer of the cable.

The four cables according to the invention and known cables with the same structures and dimensions, but having their conductors impregnated with known fillers, were subjected to experimental tests for determining their capacity to prevent any water migration along their conductors.

For carrying out the experimental tests, only the apparatus itself described in the Standards EDF HN 33-S-51 and consisting of a water-filled hose 10 meters long, having a diameter of 200 mm and provided with removable lids for sealingly closing the end openings was used. At a central position on the hose, a small tube extended from the hose, and the small tube, terminated in a glass tube which communicated with a pressurized-air reservoir for varying the pressue of the water contained in the tube.

However, the actual tests for determining the capacity of the cables to impede any water migration along the conductor which were carried out did not take place according to the said Standards because the test conditions established by said Standards were considered not to be severe enough for guaranteeing, in an absolute and reliable way, that cables overcoming these test conditions were truly free, under all conditions, from the risks of having water migrating along the cable conductor.

For carrying out the said tests, cable lengths 11 m long were used. In a central portion of each cable length and for a length of 5 m, the conductor, consisting of the rope impregnated with filler compound, was bared.

Prior to the formation and preparation of the cable lengths to be tested in the manner indicated, the cables were subjected to alternative bendings, with winding and unwinding them for three consecutive times, around a drum that has an outer diameter equal to 20 times the value of the outer diameter of the cable. Said operation was effectuated for simulating the most severe stresses to which a cable could be subjected during the cable installation or laying of a submarine cable.

The cable lengths were inserted into the testing apparatus with their ends extending through holes present in the apparatus lids. The cables were sealed and held at the lids by gaskets which engaged the outer semiconductive layer.

The tests were carried out with introducing into the apparatus separately industrial type of water and sea water.

A first series of tests were carried out with setting of the water pressure at 3 bars inside the apparatus for 24 hours.

After said period of time, the water pressure was increased to 50 bars and said pressure was maintained for 24 hours. Subsequent to this period of time, it was ascertained that whereas with the four cable lengths according to the invention, there was no issuance of water from the cable length ends, but in the case of the known cable samples, it was noted that water dripped from both of the ends of the cable length ends.

However, on examining the samples of cables according to the invention, where the conductors were filled with compounds which did not swell when contacting water, it was also found that traces of water had reached up to the extremities of the cable lengths.

This signifies that cables according to the invention, the conductors of which are filled with compounds which do not swell on contact with water, have a greater capacity than that of the known cables for obviating the migration of water along the conductor and would guarantee, in those cases when said cables are used in land environments, a great resistance to water migration of a cable if the cable should be ruptured because in the ambient, the water would not have a hydrostatic pressure of the same order of magnitude as that encountered in submarine installations.

In the case of a submarine cable, a guarantee of the capacity of this cable for preventing water migrating along the conductor, should a rupture in the cable occur, is had by impregnating the said cable conductor with a compound of the invention which is capable of swelling when contacted by water.

A second series of tests was carried out upon two samples of cables according to the invention in which the two conductors were filled with two examples of compounds which are swellable on their contacting water.

For this second series of tests, subsequent to the 24 hour period of remaining in contact with water pressurized at 50 bars and without altering this water pressure, clamps were connected to the ends of these cable conductors contained in the testing apparatus and a current was caused to pass through the conductor in such a way as to bring the temperature up to 95° C. and then allowing the conductor to remain at this temperature for 8 hours.

After the 8 hour period ended, the clamps were removed, and for 16 hours, the cable was allowed to cool while keeping the pressure of the water inside the apparatus at a value of 50 bars.

This thermal cycle of 8 hours of heating and of 16 hours of cooling, was repeated five times while maintaining the pressure of the water inside the apparatus at a value of 50 bars.

At the end of this second series of tests, intended for simulating the conditions under which a submarine cable can be found subsequent to a rupture taking place after a long period of use, it was verified that no water was found to drip from the ends of the cable lengths.

Moreover, on examining the cable lengths filled according to the invention and which had already been subjected to the second series of tests, it was verified that the swelling of the filler inside the conductor had occurred along a tract of less than 1 meter long starting from the bared extremity of the conductor in the cable lengths used for the tests.

The known cables were not subjected to the second series of experimental tests described above because these cables were found incapable of preventing water migration in the first series of experimental tests.

The results of the experimental tests show that cables according to the invention can achieve the objects that were proposed.

The methods used for the experimental tests which were adopted were more severe than those imposed by the previously cited Standards and, in particular, those for simulating the conditions wherein a cable with an extruded insulation and a filled conductor which has been in use from an extended period of time and has been laid in a submarine ambient and at a depth of 500 m (corresponding to a hydrostatic water pressure of about 50 bars) and there is a rupture in the cable causing the risk of water migrating along the cable.

Such conditions, which, practically speaking, can be considered the most serious ones which can be encountered by a cable having an extruded insulation and provided with a filled conductor, not cause a risk of water spreading along the conductor because any such water migration never exceeds the length of 1 meter from the cable zone where the rupture occurs.

This signifies that, even under any whatsoever working conditions and with the cable according to the invention, the maximum safety and reliability is guaranteed with respect to the risk of any formating of trees in the extruded insulation of cables which can be caused by the migration of even traces of water in the conductors of the cables themselves.

The achievement of this result is due to the filler for the conductor because the critical characteristics it possesses and which are essential for achieving the stated objects and for the obtaining of which the special method of the invention contributes.

In fact, with said method, it is possible to guarantee that the filler introduced into the conductor embeds all the single component wires and also fills up every space between such wires thereby obviating any possible risks of there being ways for water to migrate along the conductor.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In an electric cable comprising at least one conductor surrounded by a semiconductor layer contacting said conductor and a layer of extruded insulation surrounding said semiconductive layer, said conductor comprising a plurality of metal wires laid-up together, and a polymeric filler compound filling any otherwise empty spaces between said wires, wherein the improvement is that said polymeric filler compound is a compound which, as compounded, is extrudable and has a Monney viscosity at 100° C. in the range from about 10 to about 60 and a Shore A hardness at room temperature in the range from about 10 to about 90 whereby said spaces are filled with a solid and hard compound extruded between said wires 2. An electric cable as set forth in claim 1 wherein said compound has a Mooney viscosity at 100° C. of from 20 to 40 and a Shore A hardness at room temperature of from 50 to 80.

3. An electric cable as set forth in claim 1 wherein said filler compound comprises a hygroexpansible organic powder in an amount sufficient to cause said compound to swell upon contact with water for 10 seconds by at least 5% and to asymptotically approach swelling of at least 40% with longer contact with water.

4. An electric cable as set forth in claim 3 wherein said amount of powder is sufficient to cause said compound to swell upon contact with water by at least 10% and to asymptotically approach swelling of at least 60% with longer contact with water.

5. An electric cable as set forth in claim 3 wherein said powder is substantially insoluble in water, has a particle size less than 200 microns, has a weight loss when heated at 105° C. of less than 7% and has a water retention capacity of between 100 and 800 cm$^3$ for 1 gram of powder with a wetting time of between 1 and 5 seconds and a water dispersion of said powder has a pH of between 6.5 and 7.5.

6. An electric cable as set forth in claim 5 wherein at least 50% of the particles of said powder have dimensions less than 150 microns.

7. An electric cable as set forth in claim 1 wherein said conductor has a plurality of layers of said wires and wherein there is hygroexpansible organic powder in the spaces between the wires of the outermost layer and the wires of the next adjacent layer.

8. An electric cable as set forth in claim 1 wherein the polymer contained in said polymeric filler compound is a polymer selected from the group consisting of natural rubber, butadienestyrene copolymers, ethylene-vinyl-acetate copolymers and mixtures thereof.

9. Electrical conductor comprising a plurality of metal wires laid up together and a polymeric filler compound filling an otherwise empty space between said wires, wherein the improvement is that said polymeric filler compound a compound which, as compounded, is extrudable and has a Mooney viscosity at 100° C. in the range from about 10 to 60 and a Shore A hardness at room temperature in the range from 10 to about 90 whereby said spaces are filled with a solid and hard compound extruded between said wires.

10. Electric conductor as set forth in claim 9 wherein said filler compound comprises a hydgroexpansible organic powder in an amount sufficient to cause said compound to swell upon contact with water for 10 seconds by at least 5% and to asymptotically approach swelling of at least 40% with longer contact with water.

11. Electrical conductor as set forth in claim 10 wherein said powder is substantially insoluble in water, has a particle size less than 200 microns, has weight loss when heated at 105° C. of less than 7% and has a water retention capacity of between 100 and 800 cm$^3$ for 1 gram of powder with a wetting time of between 1 and 5 seconds and a water dispersion of said powder has a pH of between 6.5 and 7.5

12. An electric conductor as set forth in claim 9 wherein the polymer contained in said polymeric filler compound is a polymer selected from the group consisting of natural rubber, butadiene-styrene copolymers, ethylene-vinyl-acetate copolymers and mixtures thereof.

* * * * *

UNITED STATES PATENT AND TRADEMARK OFFICE
CERTIFICATE OF CORRECTION

PATENT NO. : 4,791,240
DATED : December 13, 1988
INVENTOR(S) : Marin et al

It is certified that error appears in the above-identified patent and that said Letters Patent is hereby corrected as shown below:

In the Abstract: line 4, "extrudced" should read --extruded--;

Col. 1, line 45, "at" should read --it--;

Col. 2, line 24, after "type," insert --whereby any possible migration--;

line 52, "pre set" should read --per se--;

Col. 10, line 60, "Monney" should read --Mooney--;

Col. 12, line 5, "an" should read --any--.

Signed and Sealed this

Fifteenth Day of August, 1989

Attest:

DONALD J. QUIGG

*Attesting Officer*  *Commissioner of Patents and Trademarks*